United States Patent [19]

Knüsting

[11] 4,166,352
[45] Sep. 4, 1979

[54] HAY-MAKING MACHINE

[75] Inventor: Gregor Knüsting, Lengede, Fed. Rep. of Germany

[73] Assignee: Wilhelm Stoll Maschinenfabrik GmbH, Lengede, Fed. Rep. of Germany

[21] Appl. No.: 797,240

[22] Filed: May 16, 1977

[30] Foreign Application Priority Data

May 20, 1976 [DE] Fed. Rep. of Germany ....... 2622486

[51] Int. Cl.$^2$ ........................................... A01D 81/00
[52] U.S. Cl. ........................................ 56/366; 56/370
[58] Field of Search ................ 56/365, 366, 367, 370, 56/377

[56] References Cited

U.S. PATENT DOCUMENTS

| 3,910,019 | 10/1975 | Schlittler | 56/367 |
| 4,026,093 | 5/1977 | Knusting et al. | 56/370 |
| 4,056,923 | 11/1977 | Zweegers | 56/366 |

FOREIGN PATENT DOCUMENTS

| 1372230 | 8/1964 | France | 56/370 |
| 1406788 | 6/1965 | France | 56/370 |

Primary Examiner—Russell R. Kinsey
Attorney, Agent, or Firm—Blanchard, Flynn, Thiel, Boutell & Tanis

[57] ABSTRACT

A hay-making machine having a plurality of rotary rakes thereon which are rotatably driven about generally vertical axes or rotation. The hay-making machine is supported by a plurality of wheels to facilitate its movement relative to the ground. The hay-making machine is connected by a hitch mechanism to a tractor and the rotary rakes are driven by a shaft connection to the power take-off equipment on the tractor. The hay-making machine is comprised of a main frame and auxiliary frames. The main frame is pivotally secured to the hitch and the auxiliary frame is connected pivotally to the main frame to compensate for variations in ground irregularities. Telescoping shafts are utilized on the machine to facilitate a change in length between the rotary rake members and the hitch as the hay-making machine moves relative to the ground.

21 Claims, 19 Drawing Figures

HAY-MAKING MACHINE

FIELD OF THE INVENTION

The invention relates to a hay-making machine comprising several rotary rakes which are rotatably driven about approximately vertical axes and are supported on the ground through wheels which are arranged in groups on auxiliary frames, which auxiliary frames in turn are laterally swingably and fixable in various swiveled positions on a main frame and can be coupled, on the one hand, through a connecting device to a tractor which has a power-takeoff shaft and can be inclined, on the other hand, through a rotary rake inclination adjustment and comprising a main gearing which is driven from the tractor and from which the individual rotary rakes are directly driven.

BACKGROUND OF THE INVENTION

In a hay-making machine which has four wheels and is known from German Offenlegungsschrift No. 2,410,453 the hay-making machine is secured by means of a three-point coupling device to the tractor and for transport and/or changing into a different operating position can be lifted through a tractor contained hydraulic lifting device. It is thereby still preferable that based on the relatively high weight of the machine, on the one hand, a strong tractor hydraulic system must exist and, on the other hand, to prevent a rearward tilting of said coupled unit about the rear tractor wheels the front end of the tractor must have a sufficient counterload—thus a tractor with substantially greater horsepower output (than is needed for the movement of the hay-making machine) is required, as it, however, is otherwise not needed in many agricultural operations and therefore is often also not available. Since in many tractors the three-point coupling device is lacking, the use of the known four-wheel, universally operating hay-making machines is limited.

A further disadvantage of the known construction is an interference with the driving characteristics of the tractor, in particular during transport.

Furthermore a special construction, in particular power distribution is required which is partially relatively expensive in construction and thus makes the whole unit expensive.

The purpose of the invention is to provide an improved hay-making machine of the above-mentioned type which has a large operating width and multiple use possibilities (tedding, turning, center windrowing, drawing of two individual windrows and the like) and is simply constructed. In addition, the machine has in particular a simple and long-life power transmission system—with favorable power transmitting paths which are arranged for serviceability as well as for steerabillity on tractors having lower horsepower output and no hydraulic lift and without influencing the driving characteristics of the tractor during transport and effecting the handleability of the machine.

Inventively these objectives are achieved in a hay-making machine of the above-mentioned type bypivotally connecting to the main machine frame a laterally swingable tongue which can be connected to the tractor and supports the main gearing for the machine and defines the connecting device, wherein between these parts there is arranged an inclination adjusting device, and from the main gearing each outer rotary rake is driven through a telescopelike drive shaft—seen transversely with respect to the direction of travel—and from the outer rotary rake, the inner rotary rake is driven through a longitudinally variable, preferably telescopelike drive shaft.

In a preferred manner this hay-making machine is constructed as a four-wheel universal machine having inner rotary rakes which are supported through direction-stabilized, fixable support wheels, in particular wheel pairs, and outer rotary rakes which are supported through freely pivotal support wheels, in particular individual wheels which are constructed as trailing wheels, and the main frame is pivotally connected to a forklike tongue which is bent in elevation approximately in the center longitudinal area by defining an obtuse angle with the ground and carries on the underside near the bent area, however, elevationally above the hitch on the tongue, the main drive for the rotary rakes which has preferably coaxial lateral outputs such that the drive shaft which couples the tractor power takeoff output with the input shaft to the main gearing is guided through the area of the elevationally bent portion of the tongue with an all around large clearance space (swiveling freedom). The tines can be noncontrolled or controlled and rigidly adjustable.

The inventively constructed hay-making machine is characterized, in spite of a large operating width and universal and ground-protecting operating use, by an easy handling characteristic, in particular a simple inclination adjustment characteristic, and through relatively small angled driving shafts which are only weakly loaded and have a long life. Since the inventive multi-wheel universal hay-making machine saves, compared with presently known constructions, gear units and drive shafts and, aside from a substantial construction simplification, a considerable lowering of the manufacturing expense is realized to make the machine have a great economic feasibility. Furthermore only few structural parts exist which are subjected to a mechanical stress and/or require service—from this results lesser wear, breakdown-free construction and a minimum service input. It is particularly advantageous that the hay-making machine can be arranged as a pulled implement usable with low horsepower tractors and tractors without hydraulic systems and thereby due to the special rotary rake support, on the one hand, applies to the ground only a small surface pressure by means of wheels of a proven size (however, in a special arrangement) and assures, on the other hand, also on hill sides that the laterally inclined hay-making machine will have a true track (without side slipping) machine travel in every desired direction, wherein also during travel around curves, due to a sufficient space for movement in all positions of travel, function interferences of the driving means will not occur. In addition, through the special construction of the rotary rake drive an extremely simple machine adjustment into the "tedding of two individual windrows" position is possible and for each rotary rake group only two telescopic shafts and the auxiliary frame need to be pulled apart.

In a preferred embodiment, each output shaft of the main gearing drives through a level gear another bevel gear which is associated with the rotary rake axis of rotation, from which the drive branches off at an acute angle to the driving bevel gear which is guided through auxiliary frame and which can be switched over with respect to the direction of rotation to a further rotary rake(s) through the bevel gears. The telescopelike drive shaft which drivingly connects the rotary rakes of a rotary rake group with one another can thereby have on its one end, preferably on the shaft part which extends into the gear housing of the rotary rake which is driven by the main gearing, two bevel gears which lie opposite one another in unchanged spacing and are arranged fixed with respect to rotation, and the drive shaft part which receives said bevel pinions can be axially movable, so that corresponding with the desired rotary rake direction of rotation one of the two bevel gears is adjustable into engagement with the bevel gear which is secured to the rotary rake axis of rotation and thus in a simple manner a shifting of the direction of rotation of the rotary rake which is arranged thereafter occurs.

In order to meet the requirement of a constant ground engagement of all support wheels, the wheel bearing axles of the double wheels which are associated with the inner rotary rakes are pivotal in a ground-adjusting manner about an axis which extends parallel to the direction of travel.

In order that during travel over of the material to be worked material which might be possibly carried along by the wheels is not wound up between the wheels of the twin support wheels around their axle, it is advantageous to associate with each twin support wheel in the gap between both wheels a material deflector which extends from the wheel bearing in direction of the rearward wheel perphery—this material deflector can be formed in a particular simple construction by a bar or angularly shaped portion of the wheel carrier.

In order to permit a simple changing of the machine into the transport position (with rotary rakes of each rotary rake group lying one behind the other in direction of travel), it is preferred and advantageous to uncouplably fix each drive shaft which extends from the main gearing to a rotary rake gearing, preferably at the end thereof adjacent the main-gearing by a releasable plug connection.

In addition, the purpose of the improved machine is attained, compared with the known arrangements, with respect to durability of, even in the case of impacts, to the adjusting spindle for the main frame inclination adjustment. This is accomplished by arranging the adjusting spindle in an elastic bearing part which is formed in particular by a ringlike or longitudinally slotted elastic rubber part, which is bent downwardly to form two adjusting spindle suspension points which lie one behind the other in the longitudinal direction of the spindle and is suspended on a crossbar which is provided with a spindle through-hole. Based on this elastic adjusting spindle suspension, impacts which are caused by ground irregularities cannot lead to a function-interfering bending of the adjusting spindle.

BRIEF DESCRIPTION OF THE DRAWINGS

One exemplary embodiment of the invention is illustrated in the drawings, in which.

DETAILED DESCRIPTION

Figure 1:
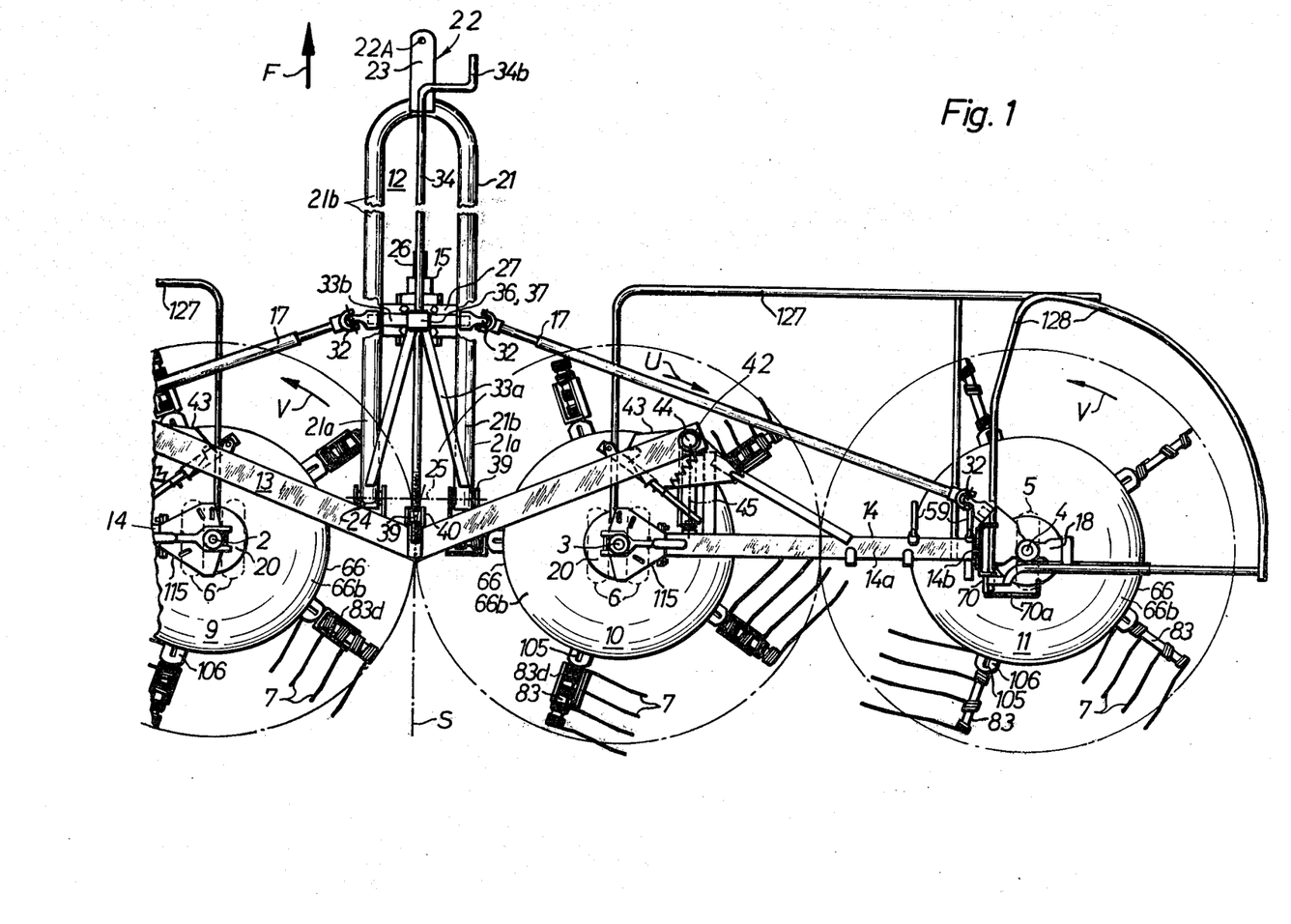
FIG. 1 is a partial top view of one side of a symmetrically constructed four-wheel supported hay-making machine.
Figures 13, 14:
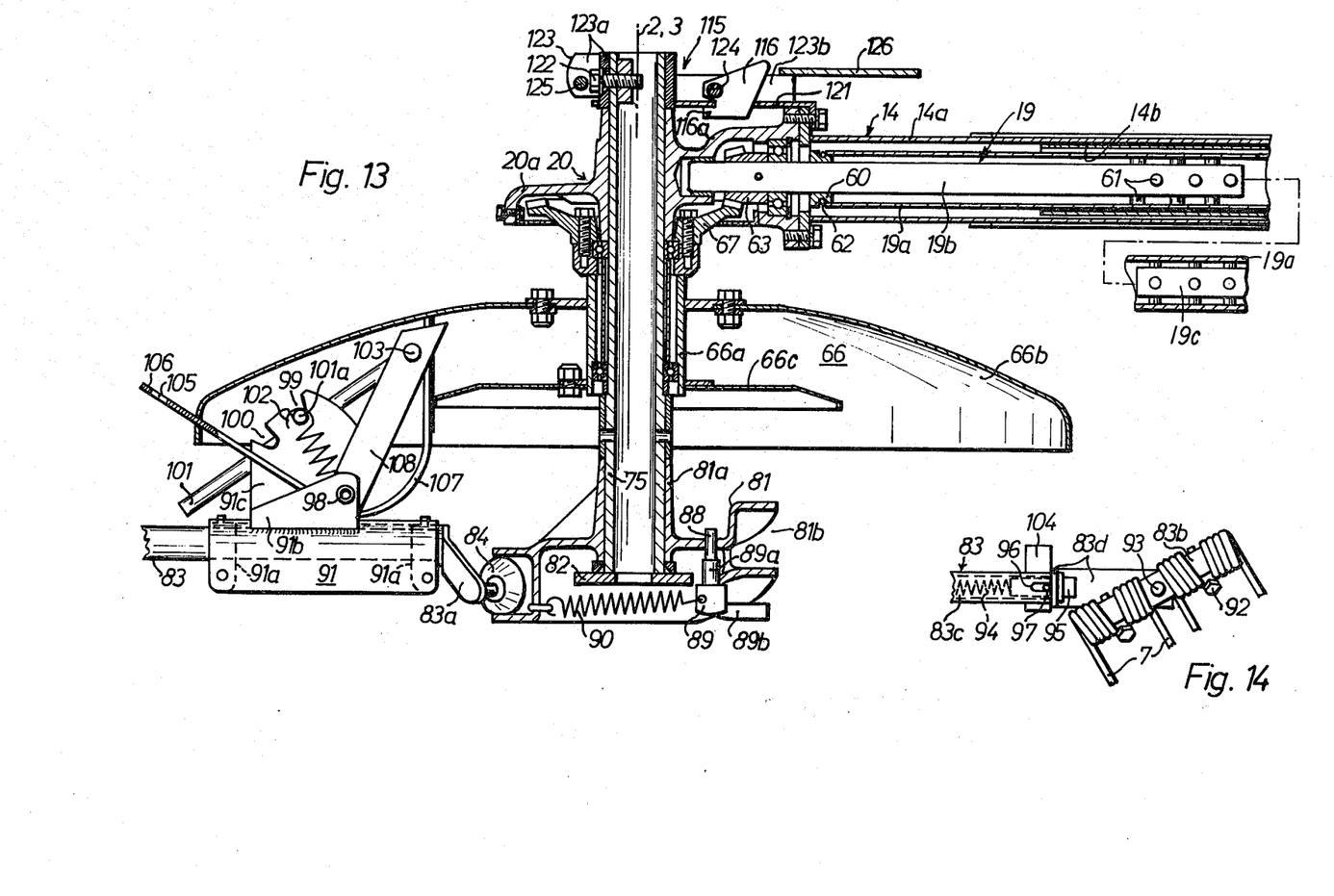
FIG. 13 is a vertical cross-sectional view taken along the line XIII—XIII of FIG. 9.
FIG. 14 is a partially sectioned side view of a tine carrying part of each inner rotary rake.
Figure 15:
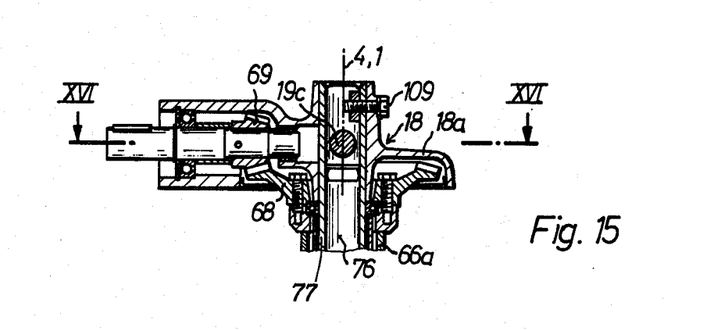
FIG. 15 is a vertical cross-sectional view of a bevel gearing which is arranged on an outer rotary rake.
Figure 16:
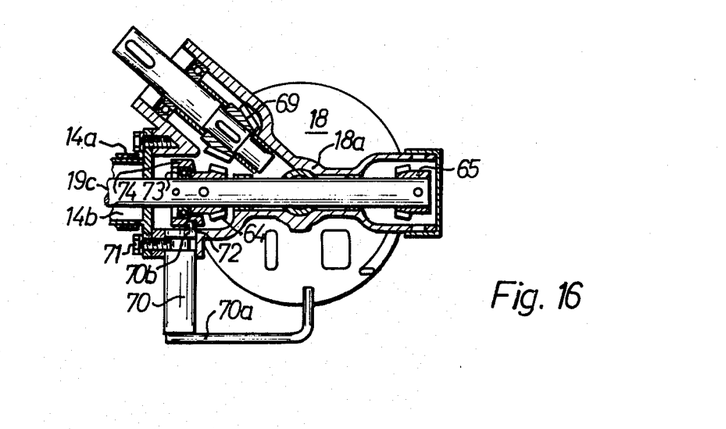
FIG. 16 is a horizontal cross-sectional view taken along the line XVI—XVI of FIG. 15.

The inventive multi-wheel hay-making machine is constructed symmetrically about a longitudinally center line and has, in the illustrated embodiment four rotary rakes 8, 9, 10, 11, which are rotatably driven about rotary axles 1, 2, 3, 4, which are vertical or adjusted to be inclined relative to the vertical, and which are supported on the ground through wheels 5 or 6 and have tines 7 which can be controllably and fixably adjusted. The rotary rakes are combined in pairs (8, 9 and 10, 11) by means of two auxiliary frames 14 which are hinged to the main frame 13 at the lateral sides thereof and are lockable in various swiveled positions relative to the main frame 13. A tongue 12 is connected to the main frame 13. Only the right frame 14 is shown in detail in FIG. 1. The rotary rake can be moved vertically for adjustment relative to the ground and is constructed mirror-imagelike relative to the longitudinal center line and is adjustable laterally and longitudinally. The rotary rake drive comes from the tractor through a drive shaft 15 onto main gearing 16 on the machine and from there each outer rotary rake 8, 11 is driven through a telescopelike drive shaft 17 to bevel gearing 18 (FIGS. 15 and 16). EAch of the adjacent inner rotary rakes 9, 10 is driven from the bevel gearing 18 through a telescopelike drive shaft 19 to bevel gearing 20 of the adjacent inner rotary rake 9 or 10 (FIG. 13).

Figure 3:
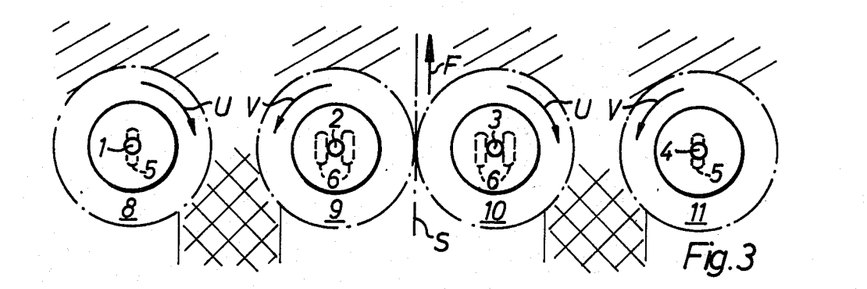
FIG. 3 is a schematic top view of the rotary rake arrangement in the "forming of separate windrow" operating position.

The individual rotary rakes 8, 9, 10, 11 can be arranged in various operating positions (compare FIGS. 1, 3 and 4), such as on a straight line which extends transversely with respect to the direction of travel F (see FIGS. 1 and 3) or by the inclusion of a preferably approximately 90° large angle on a trapezoid which opens toward the direction of travel F (see FIG. 4) or in a square transport position (see FIG. 5) which effects a considerable reduction in the machine width and the direction of rotation can be partly reversed, preferably in each case for the inner rotary rakes 9, 10 as indicated by the reference nomenclature U and V.

Figure 6:
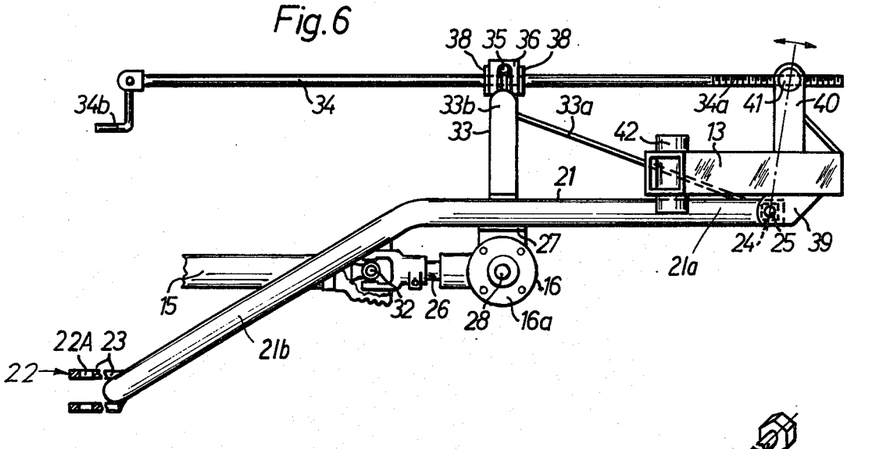
FIG. 6 is an enlarged side view of a tongue having a main frame changeably hinged in inclination to said tongue.

The tongue 12 functions as the connecting device to the tractor and is constructed forklike, with a fork part 21 which is U-shaped or V-shaped in top view. At the front end in traveling direction, the tongue has a hitch 22 thereon which permits a lateral pivoting connection of the machine to the tractor. The form the hitch 22, two plates 23 are fastened (compare FIG. 6) in a preferred manner on the fork part 21, which in this embodiment, is manufactured of cylindrical pipe material and bent about the axis of symmetry S. The plates 23 are spaced one above the other and each have a generally vertically receiving hole 22A therein. At the rearward end of the tongue, both legs of the fork part 21 each have at least one generally horizontal bearing opening 24 for receiving an axle 25 (schematically illustrated in FIG. 1) therein for forming the pivotal connection to the main frame 13. Both fork legs of the tongue 12 are on opposite sides with respect to the hitch 22 and the line of symmetry S and are each bent in the central longitudinal area such that their free-end leg parts 21a and the hitch 22 lie in vertically spaced parallel planes. The leg parts 21a of the fork part 21 which is on the rear side of the hitch are inclined upwardly and toward the rear (which can also be referred to as an "elevated bent tongue") to form an obtuse angle with the ground (compare FIG. 6).

On the half of the tongue length which is connected to the main frame 13, there is mounted the main gearing 16 for the machine on the underside of the tongue 12, in particular below the leg parts 21a of the fork part 21, adjacent the bent area between the leg parts 21a and 21b and spaced vertically above the plane of the hitch 22 so that a drive shaft 15, which couples the tractor output drive with the input shaft 26 to the main gearing 16, is guided through the area of the elevated bent tongue portion (leg part 21b) with a sufficient clearance (freedom of swing) all around. For securing the main gearing 16, it is possible to arrange on or between the leg parts 21a at least one bar or plate functioning as a carriage 27 or, and on the other hand, the gearing housing 16a itself can be equipped with clamping holders (not illustrated) which can be fixed to the leg parts 21a.

The front extending input shaft 26 and the laterally extending output shafts 28, 29 of the main gearing 16 are thereby arranged such that in all operating positions (also in the case of curved travel and/or on very hilly ground) there exists at all times a sufficient clearance for the drive shaft 15, coupled to the main gearing mounted on the tongue and the shafts 17 coupled to the output shafts 28, 29 to move within the tongue 12 and thus the movements thereof are not at all affected.

Figure 17:
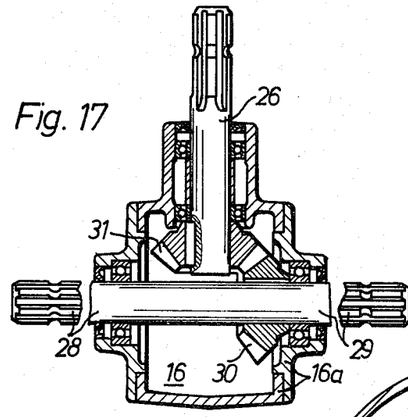
FIG. 17 is a horizontal cross-sectional view of the main gearing on the machine.

A particularly simple and advantageous main gearing construction is illustrated by the bevel gear construction shown in FIG. 17. The two laterally facing output shafts 28, 29 of the main gearing 16 are mounted on a common shaft, which shaft has only one bevel gear 30 thereon which mates with a bevel gear 31 mounted on a shaft which forms the input shaft 26. In order to permit a simple and if needed quickly releasable coupling between the gear shafts of the main gearing 16 and the drive shafts 15, 17 which gear shafts act either as an input shaft 26 or as output shaft 28, 29, it is possible to equip the shaft ends which project from the multi-part gear housing 16 a with a splined-shaped profile (compare FIG. 17) and to provide universal joints 32 on the ends of the drive shafts 15, 17, said ends being connected (splined together) with a splined-shaft profile as a suitable counterpiece.

Figures 7, 8:
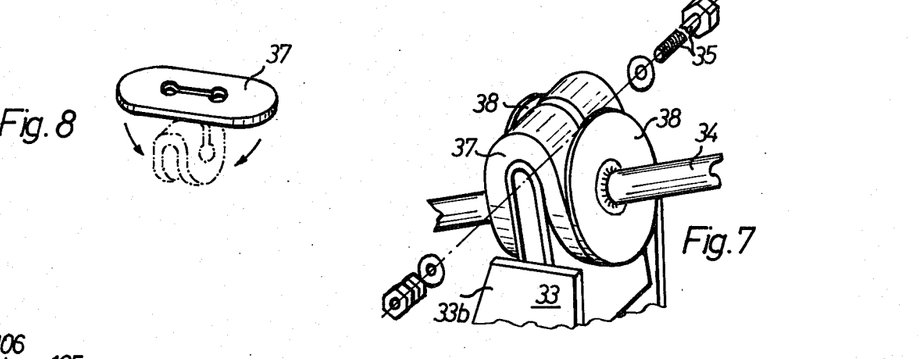
FIG. 7 is an enlarged perspective view of the adjusting spindle bearing of an inclination adjusting device which exists between the tongue and the main frame.
FIG. 8 is a perspective view of an elastic buffer of the same adjusting spindle bearing.

On the upper side of the tongue there is provided on the leg parts 21a of the fork part 21 or on the carriage 27 which serves as the main gearing support, a support arm construction 33 which supports a spindle bearing above the tongue legs (21a) and approximately on the machine axis of symmetry S for an adjusting spindle 34 which serves as the main frame inclination adjustment mechanism. More particularly, a bearing arm 33b is welded to each fork leg 21a of the tongue 12 and is held in a fixed position reinforced by means of a pair of bars 33a. The upper end of the bearing arm 33b is positioned on the axis of symmetry S (compare FIG. 1) and has an eyelet-like opening for a crossbolt 35. A support part 36 is pivotally supported on the crossbolt 35 according to FIG. 6, which support part 36 is constructed as a cross bearing and the adjusting spindle 34 is received therein, so that an elevational and pivotal adjusting spindle is provided. An elastic adjusting spindle support is particularly preferred and advantageous. The adjusting spindle 34 is for this purpose according to FIG. 7 in a support part 37 which is formed by an originally preferably flat ring or a plate of elastic material, preferably rubber, which corresponding with FIG. 8, has a longitudinal slot therein and is folded or bent downwardly to form the adjusting spindle arrangement. The slot will form two suspension points which lie one behind the other in longitudinal direction of the spindle. The suspension of the support part 37 can take place on the upper end of each support arm 33b (wherein an adjusting spindle opening exists between the suspension points which lie transversely with respect to the travel direction of the machine) or on the crossbolt 35. In any case, the adjusting spindle 34 is provided below the crossbolt 35. The crossbolt 35 serves as a safety element to prevent an unintended lifting of the adjusting spindle 34 out of its elastic suspension and is defined by a nut and bolt.

The adjusting spindle 34 is fixedly held by means of axial limiters 38, for example welded-on plates which are provided on both the front and rear sides of the support part 36, 37. The adjusting spindle 34 is preferably operated from the tractor (tractor seat). For this purpose, the spindle 34 has a threaded part 34a on the main frame end thereof and a handcrank 34b on the tractor end and serves as the rotary rake inclination adjustment mechanism about the axis of the axle 25 which extends perpendicularly with respect to the direction of travel F and approximately parallel to the horizontal. As a result, the inclination of the main frame 13 is adjusted with respect to the tongue 12. For this the laterally symmetrically constructed main frame 13 is jointedly supported (inclinably) by means of support plates 39 secured to the main frame 13 and have holes therein for receiving the hinge axes or axles 25 which extend through the support openings 24 of the tongue 12. The support plates 39 support a carrier arm 40 on the upper sides thereof. The adjusting spindle 34 partly extends through a pivotally supported spindle nut 41 on the carrier arm 40 and the threaded part 34a form-lockingly engages the internal threads on the nut. A rotation of the spindle will cause the spindle nut 41 to move in direction of the tractor or rotary rake and thus effects a main frame relative movement (inclination change) with respect to the tongue 12.

The main frame 13 is constructed as a distortion-rigid, preferably obtuse-angled V-shaped beam having a point which is rearwardly positioned in direction of travel and is made of a profile material, like pipe (square tube), the ends of which each have a support portion for the direct arrangement of an auxiliary frame 14. The support portion is formed preferably by an upright-standing bearing sleeve 42. The main frame and bearing sleeves are welded together.

Figure 10:
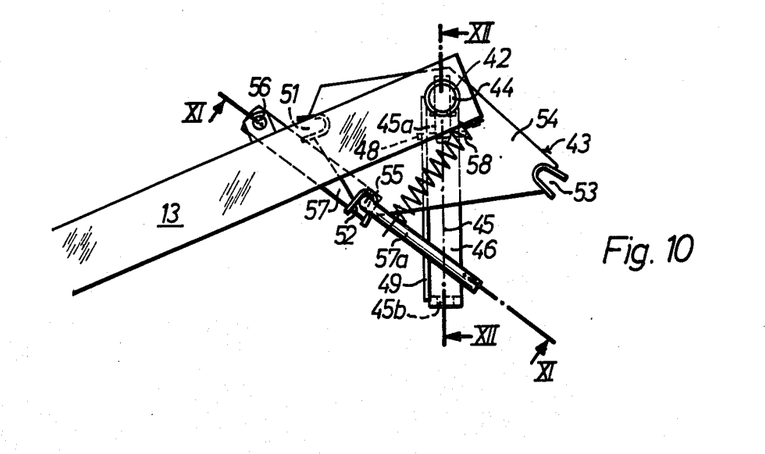
FIG. 10 is a top view of the swiveling and supporting device having an associated swiveling position locking mechanism.
Figure 12:
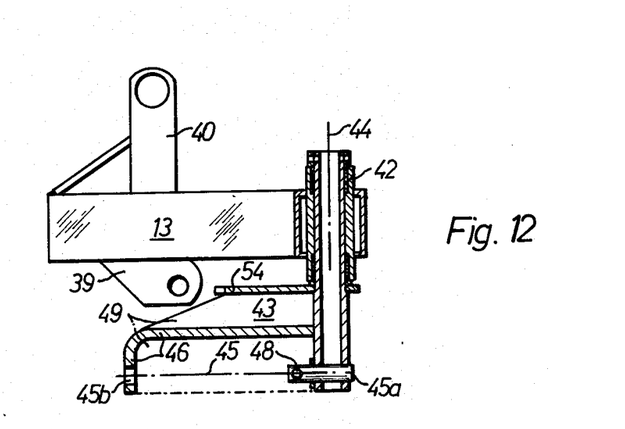
FIG. 12 is a vertical cross-sectional view taken along the line XII—XII of FIG. 10.

In each main frame bearing sleeve 42 there is supported as can particularly be seen from FIGS. 10 and 12, a pivoting and support device 43 with its vertically extending lateral pivot axle 44. The pivoting and support device 43 permits a lateral and vertical swing of each auxiliary frame 14. The lateral pivot axle 44 has a nonmovable relative thereto longitudinal pivot axis 45 defined by a pivot pin 45a associated therewith so that the axle 44 and the pivot pin 45a serve at the same time as a jointed fastening device for the auxiliary frame 14. The lateral pivot axle 44 permits a swinging of a rotary rake pair 8, 9 or 10, 11 into the individual operating positions and traveling position and the longitudinal pivot pin 452 assures an automatic adjustment of each rotary rake pair 8, 9 or 10, 11 to ground irregularities.

The lateral pivot axle 44 is generally conventionally elevationally fixed (and thus in its axial direction) by means of an axial stop and/or adjusting ring or the like and is formed in particular by a pipe axle on which is provided outside of the main frame plane the approximately horizontal elevation pivot axis 45 defined by the pivot pin 45a. This elevation pivot axis 45 is defined by two parts which are secured in a spaced relation and coaxially to one another and at a right angle with respect to the lateral pivot axle 44, namely the pivot pin 45a and a bearing opening 45b which is provided on an angular or barlike support arm 46. In installed condition, the auxiliary frame 14 has a bearing opening 45c arranged on an angular or barlike support arm 47 through which the pivot pin 45a of the pivot and support device 43 is received and the pivot pin 45d which is secured on a telescopic pipe 14a is received in the bearing opening 45b of the pivot and support device 43—a safety element 48 (FIG. 12), for example, a crosspin, adjusting ring or the like, which is associated preferably with the pivot pin 45a after the auxiliary frame installation, secures the assembled parts 43 and 14 against an unintentional release (pulling apart). To stabilize the support points, the support arms 46, 47 which extend transversely with respect to the longitudinal axis of the auxiliary frame are reinforced each by means of at least one reinforcing wall or bar 49, 50 (compare FIGS. 10 and 12 and FIG. 9).

Figure 11:
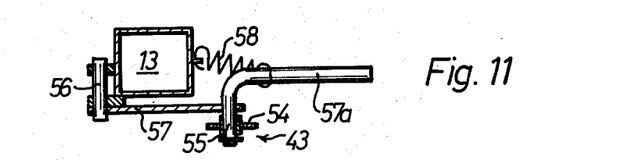
FIG. 11 is a vertical cross-sectional view taken along the line XI—XI of FIG. 10 device.

To lock the auxiliary frame in the various swiveled positions, a locking plate 54 which has lock-receiving points 51, 52, 53 therein, preferably edge opening recesses or grooves (which can be equipped with a wall-elevating dressing which can be seen from FIGS. 10 and 11) is secured, in particular welded to the plate 54 and cooperates with each one of its lock-receiving points 51, 52, 53 with a locking element 55 to create a rigid, however, releasable connection to the main frame 13. Principally particularly advantageous and preferred is the arrangement of a pinlike locking element 55 on a pivotal lever 57 which is pivotally supported laterally about an axle 56 on the main frame 13 and is spring-loaded in direction of the locking plate 54, because to effect an unlocking only a pivotal movement against the spring force need be carried out—the locking device is supported and fixed in an advantageous manner by the tension spring 58 which is secured at one end to the main frame 13 and at the other end to the pivotal lever 57, preferably on its handle 57a. The locking element 55 can thereby be constructed from an extension of a bar which forms the handle 57a, which extension is provided with a crosspin, flange or the like, which serves as an axial pull-out safety (compare FIG. 11).

Figure 4:
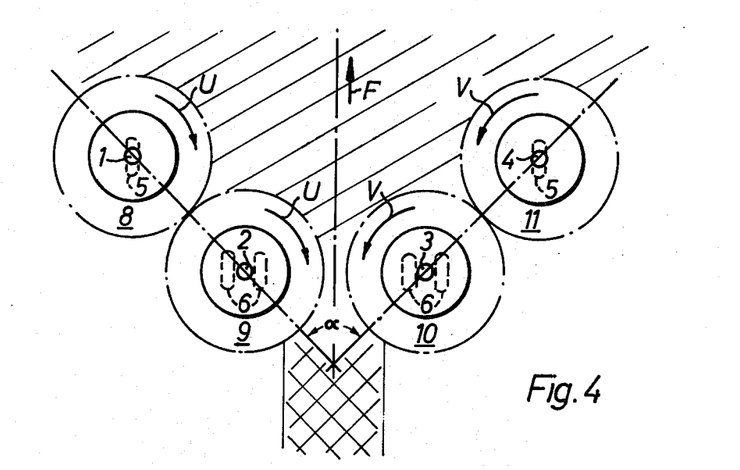
FIG. 4 is a schematic top view of the rotary rake arrangement in the "center windrow" operating position.
Figure 5:
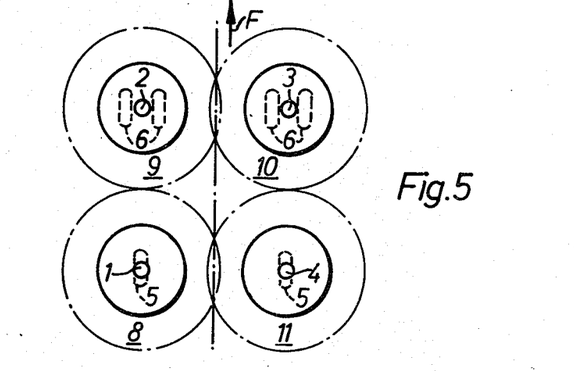
FIG. 5 is a schematic top view of the rotary rake arrangement in the "transport position"

The locking plate 54 is moved into engagement with the locking element 55 in the "center windrow" operating position (with rotary rake pairs being provided at an angle to one another corresponding to FIG. 4) with its lock-receiving point 51, in the "tedding, turning, drawing of two center windrows" operating position (with rotary rake pairs positioned corresponding to FIGS. 1 and 3, namely provided side-by-side in cross row) with its lock-receiving point 52 and in the transport position (compare FIG. 5) with its lock-receiving point 53.

Each auxiliary frame 14 consists substantially of a telescopic pipe having a square, in particular quadratic cross section, which telescopic pipe has a telescopelike drive shaft 19 extending through it and the larger (outer) pipe part 14a of which telescopic pipe has the connecting device to the main frame 13 (in particular to the pivot and support device 43) and is connected to the bevel gearing 20 of an inner rotary rake 9 or 10 and the smaller (inner) pipe part 14b of which is connected to the bevel gearing 18 of an outer rotary rake 8 or 11. The pipe parts 14a, 14b of the frame 14 which are put together can be secured by clamping means in the respectively needed telescopic lengths—it is preferred to equip the outer pipe part 14a, in particular on one cross-sectional corner, with at least one clamping screw 59 which acts/act clampingly on the inner pipe part 14b.

Each telescopelike drive shaft 19 is composed preferably of a center part (center pipe) 19a which consists of a square tube and shaft parts 19b, 19c (FIGS. 13 and 16) which are arranged axially movably therein. The shaft parts 19b, 19c which consist in particular of round steel are axially movable at one end in a sleevelike guide part 60 which is provided on the end of the center part pipe end 19a and are supported by means of crosswise extending cross pins 61 at the other end which project radially beyond the shaft part cross section and are supported with their free ends in the square tube 19a in a connection which is rotationally rigidly coupled to one another, however, are movable in an axial direction relative to one another. This telescopic design of the variable length drive shaft 19 is extremely simple and economical (substantially better pricewise than so far existing profile telescopes); furthermore the special cross pin support compensates for manufacture tolerances and also permits small misalignments. The cross pins 61 which produce in places a contact connection to the drive shaft center part 19a can be constructed as shearing pins (with a smaller shearing resistance than the remaining shaft material) so that in the case of exceeding certain torsion forces, which exceeding is caused for example by an obstancle or the like, a "desired breakage" point is created without further shaft damage and without damage to a rotary rake drive and the like. In order to be able to carry out without any problems in the case of a possible desired breakage shearing of the cross pins 61 a repair of the driving connection (exchange of cross pins 61), the guide parts 60 which are arranged on the pipe ends of the center part 19a are releasably secured—in a preferred manner they are mounted on the center part 19a by a socket type connection, in particularly they are plugged in stop-limited manner and are fixed in axial direction by means of at least one of two safety parts 62, for example, a clamping spring, safety ring, threaded pin or the like.

Both end shaft parts 19b, 19c of the telescopelike drive shaft 19 are rotatably supported by interpositioning of a slide and/or roller bearings each in the gear housing 20a or 18a of the bevel gearing 20 or 18 which is associated with an inner or outer rotary rake 9, 10 or 8, 11 and is rigidly connected with respect to movement, preferably pinned with at least one mounted bevel gear 63 or 64, 65.

As can particularly be seen from FIG. 13, the drive shaft center part 19a terminates at a pushed-together telescope shaft near the bevel gearing 20 (and 18—which, however, is not illustrated) and the cross pin 61 of each shaft part 19b, 19c which is movable in the center part 19a, which cross pin is the outermost one on the gearing side, is shifted back in direction of a drive shaft length bisector at a greater distance from the guide part 60 which furthermore forms a front wall, so that therebetween (between 60 and 61) exists a path of movement which determines the longitudinal degree of changeability.

The bevel gearing 20 of each inner rotary rake 9, 10 has a large bevel gear (bevel crown gear) 67 which is rigidly connected to a hub 66a of a rotary rake frame 66, which hub 66a can be moved about the rotary axis 2 or 3 and which bevel gear mates with the bevel gear 63 secured to the drive shaft 19 and is driven by same.

The bevel gearing 18 of each outer rotary rake 8, 11 a large bevel gear (bevel crown gear) 68 (FIG. 15), which is rigidly connected to the hub 66a of the rotary rake frame 66, which hub can be moved about the rotary axis 1 or 4 and which constantly mates on the one side with a bevel gear (bevel pinion) 69 which effects the power input and is coupled for this with the drive shaft 7 which branches off from the main gearing 16 and mates on the other side for the power output to the adjacent inner rotary rakes 9, 10 corresponding with the direction of rotation U or V which is respectively desired for the inner rotary rakes 9, 10 through the one or other of the two bevel gears 64, 65. The bevel gears 64, 65 are thereby secured within the gearing housing 18a on both sides of the rotary axis 1 or 4 with the bevel points directed against one another at such a large and preferably unchanged distance on the movable shaft part 19c, that at all times only one gear (64 or 65) can mate with the bevel gear 68 which is associated with the rotary frame 66, while the other one gear (65 or 63) is kept out of engagement (compare here FIG. 16 in consideration of FIG. 15)—by axial shifting of the shaft part 19c which carries the bevel gears 64, 65 it is possible in a simple manner to carry out the switching over of the direction of rotation of the inner rotary rakes 9, 10.

For an axial shifting of the bevel gears 64, 65 for altering the rotary rake direction of rotation, a bolt (eccentric bolt) 70 is provided with an operating handle part 70a, for example a hand lever or hand button, and which is pivotally supported, however axially limited by means of a radially engaging safety part 71, preferably a screw (or pin) which is housed in an opening in the gear housing 18a of the bevel gearing 18 and is received in an annular groove on the side of the bolt. The bolt 70 engages with its free eccentric pin-like end 70b a mounting 72 which is nonmovable with respect to the bevel gears 64, 65 and is associated (directly or indirectly) with a bevel gear (64 or 65) or the shaft part 19c. A driving ring 74 is clamped in an axially limited manner on a roller bearing 73 which is arranged in an axially limited manner on the shaft part 19c (the inner ring of which roller bearing rests at one end on the bevel gear 64 and at the other end is axially fixed by means of a safety element, for example a cross pin) (wherein said driving ring is fixed in axial direction at one end by means of a flange and at the other end by means of a guard ring which is secured in an annular groove), which has as the mounting 72 a side opening groove, which however, extends only to a partial area of the periphery (compare FIG. 16).

The switching-over devices for the direction of rotation which exist for the inner rotary rakes 9, 10 can also be constructed differently and/or can also be arranged differently.

Figure 2:
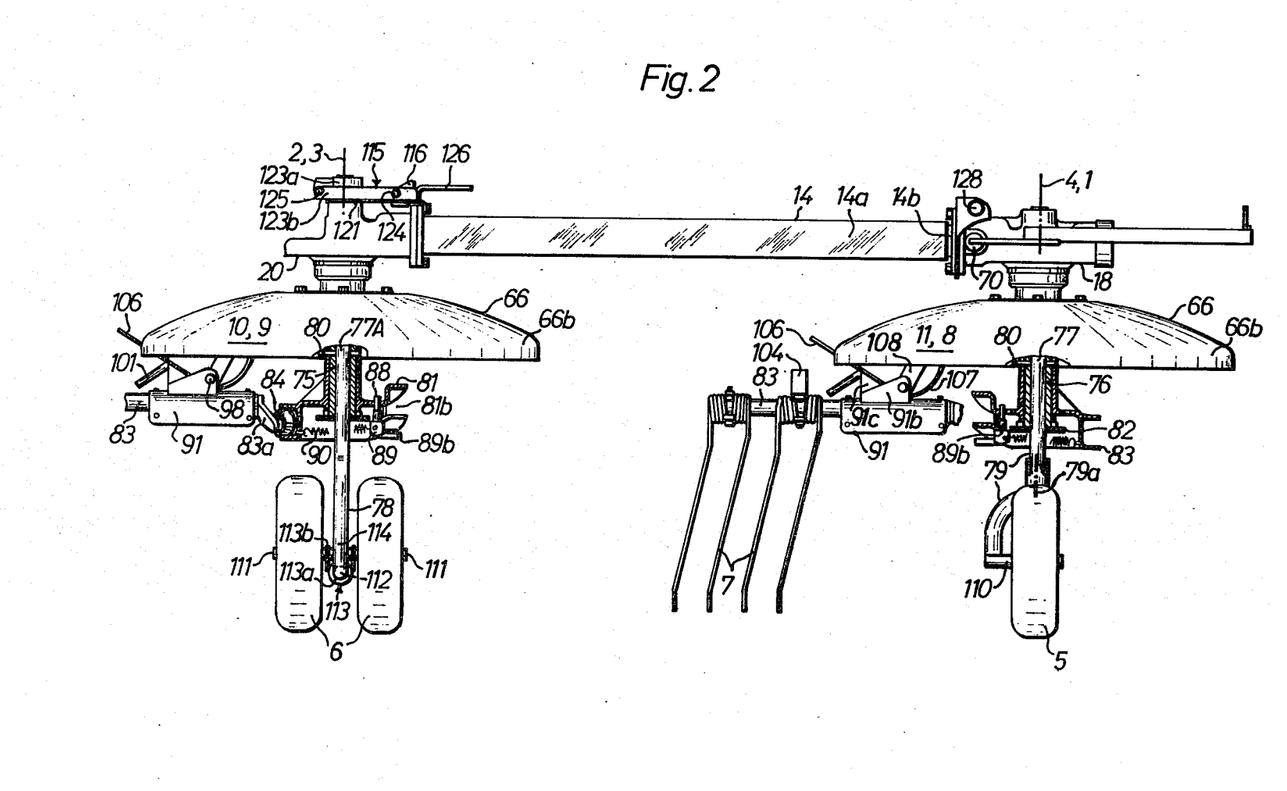
FIG. 2 illustrates an enlarged rear view of a pair of rotary rakes.

The bevel gears 67, 68 each form with the rotary rake frame 66 a unit of movement, which is supported under interpositioning friction-reducing bearings, preferably roller bearings, on an adjusting tube 75 or 76 which extends stationarily through the gear housing 20a or 18a, which adjusting tube is rigidly connected to the upright bearing shaft 77 of a wheel carrier 78 or 79 (FIG. 2) of the support wheels 6 or 5, preferably is pinned by means of a releasably provided bolt (in particular a spring cotter pin) 80.

Below the rotary frame 66 which directly carries the tines 7 there is arranged axially fixed on the adjusting tube 75, 76 of each rotary rake 8, 9, 10, 11 a control cam 81, which serves as the drive for pivoting the tines 7 into a down-swung operating position (raking position) and an up-swung out of use position (rest position) during each rotary rake rotation to change the raked material. The discharge point is rotatable relative to the adjusting tube 75, 76 on the tine rotary path corresponding with the requirements of the different "windrowing, center windrowing (V-windrowing), turning" operating positions and can be fixed in three different positions.

Figure 19:
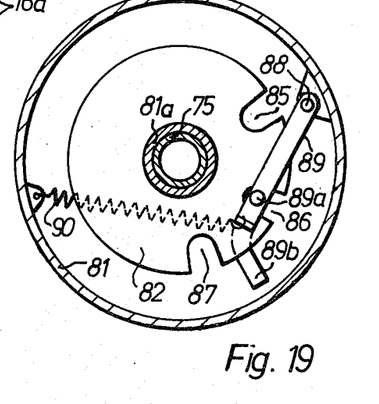
FIG. 19 is a horizontal cross-sectional view of the control cam of each rotary rake in the area of a control cam adjusting device.

The control cam 81 can be constructed as a one or multipart form member. It has a hub part 81a which is mounted in an upright position encircling the adjusting tube 75, 76 and is supported at the bottom end in particular by interpositioning a slide ring on an adjusting plate 82 which is secured, preferably welded, at the lower end of the support tube. A roller guide part 81b is arranged on said hub part 81a and is preferably radially spaced therefrom, is elevationally deformed, in particular is raised at a certain rotary angle (angular zone) and opens outwardly in the radial direction. The roller guide part 81b has for a controlled tine arrangement a control roller (cam plate roller) 84 received in the guide part 81b, said control roller being associated with each tine carrier 83 (compare FIG. 2). The roller mounting of the roller guide part 81b may be formed by two parallel extending superposed cam plates. For the relative adjustment of the control cam 81 with respect to the adjusting tube 75, 76 the adjusting plate 82 is equipped on the edge thereof with three lock-receiving means 85, 86, 87 preferably radial notches, and on the control cam 81 there is pivotally supported in the joint 88, in particular on the hinge pin, a spring-loaded lever 89 which is secured with a locking projection 89a, for example a pin, corresponding with the respective machine operating position in one of the three lock-receiving means 85, 86, 87 and thus creates a rigid, however, releasable connection between the adjusting tube 75, 76 and the control cam 81. The tension spring 90 is secured on the one side on the control cam 81 and on the other side on the lever 89 which is equipped preferably with an operating handle 89b (compare FIG. 19).

Each rotary rake 8, 9, 10, 11 has several, for example five, tine carriers 83 which are arranged with equal angular spacing from one another on the rotary frame 66 on which tine carriers there are exchangeably secured several resilient, if desired multiply bent tines 7, preferably in each case two tine pairs (double tines). The tines 7 have bearing windings which spirally surround the tine carrier 83 and are each mounted and nonmovably fixed such that they at certain loads, ground irregularities and the like can absorb shocks moving upwardly in the direction of rotation of the rotary rake (U or V). A small winding up of wire on the spring carrier cross section will facilitate this action. Each tine carrier 83 is at least partly constructed as a shaft and is supported rotatably (swingably) in a bearing part 91 which is equipped with friction-reducing bearing points 91a, like axially fixed plastic bearing sleeves or the like and has on the control-cam end thereof a roller lever 83a which is mounted similar to a bent crank-arm (in particular nonreleasably secured) to the tine carrier 83 and is provided with a bearing axis for the control roller 84. The tine fastening and roller lever position are tuned to one another such that in the tine operating position the control roller 84 operates in a trailing (towingly) manner, namely it follows the tine carrier bearing 91a in the rotary rake direction of rotation U, V and the roller lever longitudinal axis is thereby inclined at approximately 45° with respect to the vertical.

In order to assure the aforementioned favorable resiliency of the tines (rearward upward bending in the winding direction) also in the case of a change of the direction of rotation of the inner rotary rakes 9, 10, the tines 7 of the inner rotary rakes 9, 10 are capable of being turned wherein naturally also the tine carrier roller lever 83a is moved into a trailing position, in particular is pivoted through corresponding tine carrier rotation at approximately 90° about the longitudinal axis. Turning of the tines 7 can be carried out in two ways; either the individual tine pairs are loosened in their fastening device 92 (in particular a head screw with a nut which extends through the tine carrier 83 and the clamping holder), are pulled off from the tine carrier 83, are pivoted at 180° and are mounted and secured on the tine carrier 83 or all tines 7 which are associated with a tine carrier 83 are secured on a pivotally and fixably arranged tine carrier part 83b (compare FIG. 14) (See also my U.S. Pat. No. 4,062,174.

This lastmentioned turning possibility can be carried out simply and quickly, and is therefore particularly advantageous and preferred. Each tine carrier 83 of the inner rotary rakes 9, 10 is thereby divided in longitudinal direction and has a fork part 83d on a bearing arm 83c supported in the bearing part 91. In the end zone of said fork part there is provided a transversely extending bearing bolt 93 which serves as a pivot axis during the tine turning for the swingable tine mounting unit (7, 83b), and on which bearing bolt is supported the tine carrier path 83b which is equipped with two tine pairs. For the rigid nonswingable, however, again releasable connection (locking) of the parts 83b and 83c, a lock part 95, preferably a locking bolt, is arranged to be axially movably on the bearing-arm in the fork end, which lock part 95 is spring loaded in longitudinal direction and is preferably under the action of a pressure spring 94 which is stored in the tine carrier bearing arm 83c which is at least partly tube-shaped. The lock part 95 engages in locking position one of the two open ends of the lock-receiving means, for example tube ends, locking notches or the like, of the tine carrier part 83b which holds the tines 7. The resilient lock part 95 can be operated through a carrier pin 97 which is movable in a slotted hole 96 of the tine carrier bearing arm 83c and is secured on/in the lock part 95. The locking mechanism for fixing the tine carrier part 83b which has the tines 7 can of course also be constructed differently and/or be arranged differently.

The preferably radially extending rotary rake tine carriers 83 are held in the case of "controlled tines" approximately in a horizontal plane and are held in the case of a "rigid positioned (noncontrolled) tines" swung upwardly about an axis (pivot pin) 98 which exists on the rotary frame 66 (so that all of the tine carriers 83 lie on a cone which is tapered on the ground side). For this each bearing part 91 which has a tine carrier 83 extending therethrough is supported elevationally swingably on the axis 98 with two, preferably mounted on the upper side, side-by-side bearing plates 91b, 91c and is equipped with a locking device. In a preferred manner, at least one (91c) of its bearing plates 91b, 91c has two lock-receiving points 99, 100, preferably edge opening locking notches which are provided one behind the other in swiveling direction and at a certain angular spacing. Each one of the points (99 or 100) is held in a locking connection with a locking part 101a, for example a locking pin, on a locking lever 101, which locking lever can be pivoted elevationally about an axis 103 against the force of a spring generated by a hold-back spring element 102, preferably a tension spring which is suspended on the parts 98 and 101a. The locking lever may be constructed to have an F-shape in top view, wherein the upper F-crossbeam forms a bearing axis—the locking part 101a cooperates with controlled tines 7 with the lock-receiving point 99 and at noncontrolled tines 7 with the lock-receiving point 100. In order to be able to fix (to set rigid) in the case of a noncontrolled tine arrangement the upwardly swung tine carriers 83 for the "tedding" operating position having downwardly directed tines 7, the rotary frame 66 and the tine carriers 83 have cooperating locking members, which after coupling occurs prevent a rotational movement of the tine carriers 83 about their longitudinal axis. In a preferred manner there is on each tine carrier 83 arranged a locking nose 104, for example an upright plate, pin or the like, which when the tine carrier 83 is swung upwardly, engages an eyeletlike lock-receiving means 105 of the rotary frame 66, in particular an oblong slot of a plate which is provided on the rotary frame 66, so that the inventive haymaking machine can then be used as a tedder. Both the locking device for the two tine carrier pivoting positions and also the locking to the rotationally fixed tine carrier rigid position on the rotary frame 66 can be designed differently.

Each rotary rake frame 66 has on its hub 66a which is supported on the adjusting tube 75, 76 a bell-like hood member 66b and spaced therebelow a smaller, platelike reinforcing plate 66c (FIG. 13), on which in the area of each tine carrier 83 there is welded a holder 107 which is of barlike material particularly of flat material (flat steel), and which holder is stabilized through at least one, preferably two bars 108 secured thereto on both sides thereof and which support the bearing points for the axes 98, 103 (compare FIG. 13). The end of the holder 107 adjacent the bell can penetrate through the hood member 66b and can form the plate 106 which is on the outside and which is equipped with the lock-receiving means 105.

While the outer rotary rakes 8, 11 have individual support wheels 5 as running wheels, the inner rotary rakes 9, 10 each have associated therewith two combined wheels which are preferably constructed as twin support wheels 6 to thus operate in the area of the largest proportion of the machine weight. According to a further purpose of the invention, in spite of the pull load (that is weight not carried by the tractor) a relatively small pressure load is applied onto the traveled ground surface and to assure thereby a stable machine travel and a maintaining of the track, in particular on hill sides of hilly land. The individual support wheels 5 are thereby during the driving operation held freely pivotable about an upright axis 79a and the twin support wheels 6 are held in a rigid direction stable position. The wheel members of both wheel types 5, 6 are identical and are constructed in a reliable size.

For easy action, automatic direction adjustment during arcuate travel, the individual support wheels 5 are constructed as trailing wheels, namely with a wheel bearing axis behind its vertical swivel axis 79a. The wheel carrier (support member) 79 is thereby substantially divided in two and has as a first part, a bearing shaft 77 which is fixedly received in the adjusting tube 76 (which is hereby positioned rigidly on the housing 18a of the bevel gearing 18, preferably corresponding with FIG. 15) is secured by means of a screw-nut-connection 109), which bearing shaft has a rearward bend extending in traveling direction and a lateral swivel bearing part, for example a bearing sleeve or a bearing mandrel, in or on which by forming the lateral swivel axis 79a the second part is supported in a swivel bearing counterpiece (bearing mandrel or bearing sleeve), which at least on one side partly grips over the wheel member and has the rigidly secured wheel bearing axis 110 (compare FIG. 2).

The wheel carrier (support part) 78 of each twin support wheel 6 can be constructed in the simplest manner as an upside down T-shaped part having a bearing shaft 77A at the upper end and a transversely extending wheel bearing axis 111 at the lower end. However, in order to achieve a better ground engagement and an automatic adjustment of the wheel members to ground irregularities, which wheel members are rotatably supported on both sides of the wheel carrier 78 and are laterally spaced from one another and are axially fixed, it is preferred to arrange the wheel bearing axis 111 to be ground adjustingly pivotal about a pivot axis 112 which extends in the direction of travel F. For this purpose, a cross bearing 113 (compare FIGS. 2 and 18) is pivotally supported and axially fixed (secure from shifting) on a support arm which is at the bottom end and which extends in the direction of travel and preferably is formed by a bent (or angled) part of the wheel carrier 78 and also serves as the swivel axis 112, which cross bearing 113 supports the radial bearing axis 112 (which can be formed by a through-going axial part or by two coaxial pivot pins). A simple, stable and advantageous cross bearing exists, if on a sleeve 113a which is provided advantageously with a friction-reducing lining (sleeve bearing or the like) and which is supported laterally tiltably on the wheel carrier bearing arm (112) there are secured (welded on) two plates 113b which have the wheel bearing axis 111 extending therethrough and are welded thereto.

In order that possibly plants (in particular blades) which are taken along by the wheel members of each twin support wheel 6 cannot wind themselves in a manner to interfere with the operation between the individual wheel members around the wheel bearing axis(es) and/or can settle therebetween, each twin support wheel 6 has associated with it in the gap existing between its wheel members a material deflector 114 which extends backward in traveling direction F, which material deflector holds down the material which is lifted off the ground, removes it from the wheel member and prevents it from winding around the axle and the like. This material deflector 114 extends between the cross bearing 113 and the rearward wheel periphery. It may be constructed rectilinearly, bent or arc-shaped in the longitudinal extent, thereby particularly risingly and may form a separate part (not illustrated) which is secured on the wheel carrier 78 or may constitute a portion of the wheel carrier 78. Particularly preferred is the design of the material deflector 114 according to FIG. 18, wherein the wheel carrier 78 in the wheel area constitutes a material-deflecting bar which is connected after the wheel bearing.

Figure 18:
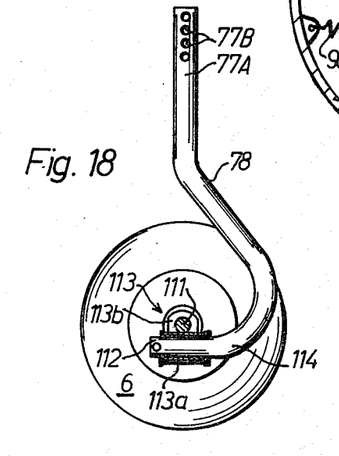
FIG. 18 is a horizontal cross-sectional view of a twin support wheel which is associated with the inner rotary rakes.

All support wheels 5, 6 can be adjusted vertically relative to the rotary rake drive—in a simple and preferred manner several cross bores 77B are therefore provided one above the other in the upper area of the bearing shaft 77A of each wheel carrier 78, 79 (compare FIG. 18). The cross bores correspond with the necessary elevational adjustment and each one is used for receiving the connecting means (bolt 80) which produces the connection thereof to the adjusting tube 75 or 76 (compare FIG. 2).

In order to be able to change the direction-stable arrangement of the twin support wheels 6 of each inner rotary rake 9, 10 and in order to be able to fix anew the twin support wheels 6 in a differently required position which points in the direction of travel, the adjusting tube 75 which is rigidly connected with respect to movement to the wheel carrier 78 is freely rotatably supported in the gear housing 20a of the bevel gearing 20 and has a locking device 115, by means of which the wheel carrier can be fixed in various positions and thereby relative to the longitudinal axis of the auxiliary frame (connecting line between the rotary rakes 8, 9 or 9, 10 of each rotary rake pair). For this each wheel carrier 78 which is rotatable with respect to the auxiliary frame 14 has associated with it a locking part 116, for example a pawl, locking pin or the like, which is fixedly connected with respect to rotation to said wheel carrier 78 and which cooperates with each one of several lock-receiving points 117, 118, 119, 120 which are associated with the auxiliary frame 14 and which are provided centrically around the rotary rake axis of rotation 2, 3 at a specified angular spacing from one another (determined by the operating positions).

Figure 9:
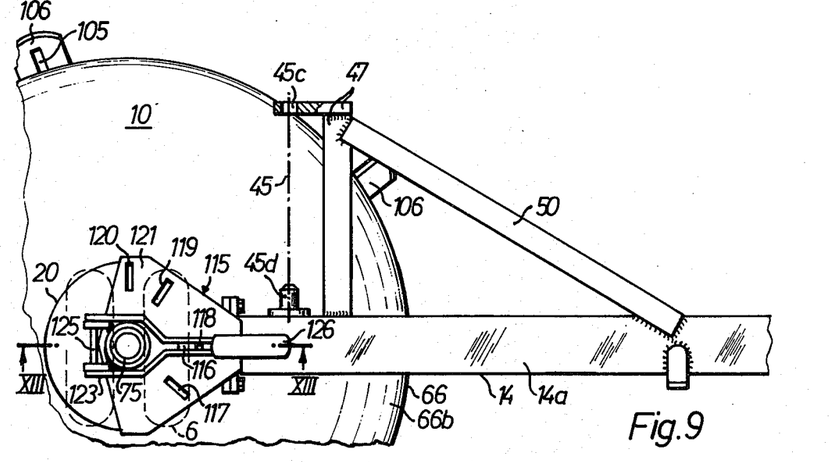
FIG. 9 is a top view of the end zone of an auxiliary frame adjacent the main frame.

In a preferred manner, the lock-receiving points 117, 118, 119, 120 are formed by slots which extend radially with respect to the rotary rake axis of rotation and which are part of a locking plate 121 which on the one edge is centered directly or indirectly on the upper adjusting tube which projects over the gear housing 20a and on the other edge is connected to the auxiliary frame 14, in particular is screwed in a flange area (connecting area of the parts 14a and 20a) (compare FIG. 9 and 13). The lock-receiving means 117 receives the locking part 116, when the twin support wheels 6 are positioned perpendicularly with respect to the lateral swivel axle 44 for the auxiliary frame swinging over into a different operating position or into the transporting position for the easy moving with the wheel bearing axis(es) 111 (so that then during the swinging operation, the wheels carry out without any disadvantageous sidewise scrubbing on the grass a curve around the auxiliary pivot axis). The lock-receiving point 118 serves to fix the twin support wheels 6 so that they point in the direction of travel in the "tedding, turning, drawing of two individual windrows" operating positions. The lock-receiving point 119 serves to keep the fixed twin support wheel mounting pointing in the direction of travel in the "center windrowing" operation position and the lock-receiving point 120 is provided for the twin wheel fixing which is direction stable for the transport position.

The locking part 116, which in each case is received in a lock-receiving point 117–120, of the locking plate 121 has a holding protuberance 116a which securely lockingly grips under the locking plate 121. The locking part 116 is elevationally pivotal about a bearing bolt (pivot axis) 124 on a holder 123 which is fixedly connected with respect to rotation (rigid with respect to movement) to the adjusting tube 75 preferably by means of a screw-nut connection 122 and is held based on a suitable center of gravity position (compare FIG. 13) through dead weight in a locking position. The holder 123 of the locking device 115 consists substantially of two parts and is composed of a bearing part 123a which is connected to the adjusting tube 75 and which carries an approximately ground-parallel (horizontal) pivot axis 125 and a swivel part 123b which can be swung elevationally about the axis 125, and is preferably equipped with a handle 126. To unlock the pawllike locking part 116, the pawl is manually elevationally swung about the axis 124 and is thereby moved out of its position in which it grips behind the locking plate 121, so that thereafter the swivel part 123b of the holder 123 is swung upwardly about the axis 125 and—together with the twin support wheel 6 which is coupled therewith—can be swung laterally about the rotary rake axis of rotation 2, 3 into the needed locking position, where a new locking function takes place.

To permit a simple adjusting of the invention haymaking machine into the transport position, each telescopelike drive shaft 17 which extends from the main gearing 16 to the bevel gearing 18 of an outer rotary rake 8, 11 is made uncouplably at one end, preferably the end of the shaft adjacent the main gearing.

An excellent characteristic of the inventive machine construction is that each drive shaft 17 which extends between the main gearing 16 and an outer rotary rake 8, 11 extends freely over its entire operating length, namely neither crosses the main frame 13 nor an auxiliary frame 14 (including the parts associated with same).

In a further preferred, however, not illustrated development of the invention, the hay-making machine is constructed with 6 wheels, wherein the machine frame and drive mechanism(s) can be taken over substantially by the 4-wheel construction and can then be supplemented. The rotary rake drive occurs thereby from the main gearing onto the most outside or center rotary rake of each 3-wheel group.

In every case (whether 4 or 6-wheels) the hay-making machine has protective bars 127, 128 which project over the rotary rakes 8–11 in the base range (compare FIG. 1) and offer in driving operation a guard to prevent a ramming protection on the front side and laterally.

If the operation "turning" is not needed, one can provide (use) in place of the longitudinally changeable auxiliary frame 14 an auxiliary frame which is nonchangeable in length, which holds the rotary rakes 8, 9 or 10, 11 of the rotary rake group in a fixed spacing. The drive shaft 19 which is arranged within the auxiliary frame is thereby, however, longitudinally changeable in order to be able to axially move the bevel gears 64, 65 for the purpose of the abovedescribed simple reversal of the direction of rotation of each inner rotary rake 9, 10.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A hay-making machine having several rotary rakes which are driven rotatingly about approximately vertical axes of rotation and are supported on the ground by means of wheels, comprising:
   a machine frame having a tongue, a main frame and auxiliary frames, said main frame being arranged hingedly on said tongue;
   at least an inner and an outer rotary rake mounted on each auxiliary frame to form one group, each inner and outer rotary rake having an input shaft for effecting a drive thereof and adjusting means for fixing said auxiliary frames to said main frame in various adjusted positions;
   a main gearing mounted on said tongue and having two lateral output shafts;
   a telescopingly elongatable drive shaft connecting each of said lateral output shafts to said input shaft to said outer rotary rake in each group and a longitudinally variable drive shaft for connecting the drive to said outer rotary rake to said input shaft to said inner rotary rake; and
   means for effecting an inclination adjustment of said main frame with respect to said tongue.

2. The hay-making machine according to claim 1, wherein said tongue is of a forked construction having parallel legs with bearing openings which are horizontally aligned, said main frame being hingedly connected to said fork legs in said bearing openings, and a hitch mounted at the front end of said tongue, and said main gearing being mounted on said legs of said tongue at the mid part thereof, said main gearing having a frontwardly extending input shaft and said two lateral output shafts which extend coaxially to one another.

3. The hay-making machine according to claim 1, wherein said tongue has a tubular construction and is in top view of a bifurcated construction having a pair of rearwardly extending legs, said legs being bent approximately in the longitudinal center thereof to form an upwardly, rearwardly inclined obtuse angle and a hitch comprising two vertically spaced plates which extend frontwardly from said tongue and have coaxial receiving holes therein and said hitch lies in a plane which is vertically spaced below and extends approximately parallel to the free ends of said legs.

4. The hay-making machine according to claim 2, wherein said main gearing is arranged on said tongue below the legs thereof and a bearing for a cranklike adjusting spindle for adjusting the inclination of said main frame is mounted above the legs of said tongue.

5. The hay-making machine according to claim 4, wherein said main gearing is positioned in a plane above the tongue hitch and a drive shaft which couples a tractor output shaft to the input shaft of said main gearing extends between the legs.

6. The hay-making machine according to claim 4, wherein said main gearing is secured to said legs adjacent the bend.

7. The hay-making machine according to claim 1, wherein said tongue is hinged to an obtuse-angled V-shaped main frame, the V-tip of which faces rearwardly, the ends of said main frame each having a vertical support portion, in which directly is pivotally supported one of said auxiliary frames which supports said rotary rakes, said auxiliary frames being variable in length.

8. The hay-making machine according to claim 7, wherein said support portions which are provided on said main frame comprise upright bearing sleeves on which is supported a vertically extending lateral pivot axle of a swivel and support device which also includes a horizontal pivot axle which extends generally parallel to the direction of travel (F) and wherein said swivel and support device has a locking plate secured to each auxiliary frame and has three lock-receiving means thereon, and a locking element on said main frame receivable into one of the three lock-receiving means to lock said locking plate in one of three selectable positions and consequentially lock said auxiliary frames in three selectable positions.

9. The hay-making machine according to claim 1, wherein said longitudinally variable drive shaft includes a tubular telescopingly elongatable member having a telescopingly elongatable drive shaft extending therethrough, wherein said outer rotary rake in each group has an output shaft driven by a first bevel gearing connected to the first-mentioned telescopingly elongatable drive shaft, said inner rotary rake in each group having a second bevel gearing connected to said telescopingly elongatable drive shaft, a driving of said first and second bevel gearings effecting a rotation of said inner and outer rotary rakes.

10. The hay-making machine according to claim 9, wherein said bevel gearing in said outer rake includes a first bevel gear secured thereto, a second bevel gear mounted for rotation about the outer rotary rake axis of rotation, and a third bevel gear connected to said telescopingly elongatable drive shaft which extends through said auxiliary frame to drive said inner rotary rake.

11. The hay-making machine according to claim 10, wherein said telescopingly elongatable drive shaft has on its one end two bevel gears which are positioned on said drive shaft opposite one another and at a fixed spacing and are arranged fixed with respect to rotation and wherein said telescopingly elongatable drive shaft is axially movable, so that corresponding with the desired rotary rake direction of rotation one of said two bevel gears is adjustable in mating engagement with said second bevel gear which is secured on the rotary rake axis of rotation.

12. The hay-making machine according to claim 11, wherein a gear housing is arranged above each outer rotary rake and includes a bolt which is provided with an operating handle part extending transversely with respect to the longitudinal axis of said telescopingly elongatable drive shaft, said bolt having a front-end eccentric pin which engages a recess in the bevel gear closest the inner rotary rake to effect a shifting in the axial position thereof.

13. The hay-making machine according to claim 1, wherein the two inner rotary rakes each have a twin support wheel, the axis of rotation of which is pivotal about an upright pivot axis and means for rigidly holding said twin support wheel in several adjusted positions.

14. The hay-making machine according to claim 13, wherein said twin support wheel has a wheel carrying axle which is supported for pivotal movement about an axis which extends in traveling direction (F) perpendicular to said upright pivot axis, on which wheel carrying axle is supported two laterally spaced wheel members.

15. The hay-making machine according to claim 1, wherein each of said rotary rakes have support wheels and means for vertically adjustably supporting said wheels for changes in elevation relative to ground level.

16. The hay-making machine according to claim 13, wherein each of said twin support wheels has a wheel carrier with a material deflector arranged pointing rearwardly in traveling direction (F) and is located between the twin wheels and generally the wheel periphery for material which is possibly carried along from the ground.

17. The hay-making machine according to claim 16, wherein said wheel carrier of each twin support wheel is formed as a material-deflecting bar which is located following the axis of rotation of the wheel.

18. The hay-making machine according to claim 16, wherein on said wheel carrier of each twin support wheel there is secured a locking part which cooperates with lock-receiving points which fix the wheel member position with respect to the machine symmetry axis (S) to facilitate travel without sidewise scrubbing in the traveling direction.

19. The hay-making machine according to claim 18, wherein said locking part includes above each inner rotary rake a locking plate which is secured on said auxiliary frame and has locking slots therein which are arranged at various angles about the rotary rake axis of rotation and thereabove on said wheel carrier there is secured a locking device which is provided with a vertically movable locking pawl having a holding nose which grips under said locking plate to lock said twin support wheel in a selected angular position relative to said auxiliary frame.

20. The hay-making machine according to claim 1, wherein said inclination adjusting means includes an adjusting spindle which is operable from a tractor and is supported in an elastic bearing means mounted on said tongue and having two spindle suspension points which lie one behind the other in longitudinal direction of the spindle.

21. The hay-making machine according to claim 1, wherein said longitudinally variable drive shaft which extends from the main gearing to said outer rotary rake includes means for facilitating an uncoupling thereof.

* * * * *